(12) United States Patent
Hashimoto et al.

(10) Patent No.: US 10,889,514 B2
(45) Date of Patent: *Jan. 12, 2021

(54) WATER TREATMENT METHOD AND WATER TREATMENT APPARATUS

(71) Applicant: Panasonic Intellectual Property Management Co., Ltd., Osaka (JP)

(72) Inventors: Yasuhiro Hashimoto, Nara (JP); Daisuke Ino, Nara (JP); Tomoyasu Takaoka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 658 days.

This patent is subject to a terminal disclaimer.

(21) Appl. No.: 15/391,273

(22) Filed: Dec. 27, 2016

(65) Prior Publication Data

US 2017/0197845 A1     Jul. 13, 2017

(30) Foreign Application Priority Data

Jan. 8, 2016 (JP) ................................. 2016-002925

(51) Int. Cl.
  *C02F 1/32* (2006.01)
  *C02F 1/74* (2006.01)
  *C02F 1/72* (2006.01)

(52) U.S. Cl.
  CPC ............... *C02F 1/725* (2013.01); *C02F 1/32* (2013.01); *C02F 2201/3227* (2013.01); *C02F 2305/10* (2013.01); *Y02W 10/37* (2015.05)

(58) Field of Classification Search
  CPC ..... C02F 1/725; C02F 1/32; C02F 1/74; C02F 1/325; C02F 2201/3227; C02F 2305/10; Y02W 10/37
  (Continued)

(56) References Cited

U.S. PATENT DOCUMENTS 5,462,674 A * 10/1995 Butters ............... C02F 1/325
                                                  210/321.69
6,372,095 B1 * 4/2002 Noguchi ............... C02F 1/32
                                                  204/157.48
(Continued)

FOREIGN PATENT DOCUMENTS

JP          2-298393        12/1990
WO       2013/111199         8/2013

*Primary Examiner* — Robert Clemente
*Assistant Examiner* — Akash K Varma
(74) *Attorney, Agent, or Firm* — McDermott Will & Emery LLP

(57) ABSTRACT

A water treatment method includes: calculating a total amount of ions contained in a total amount of an aqueous solution introduced into a first tank; when the calculated total amount of ions is greater than a first threshold value, introducing part of slurry in the first tank into a second tank; introducing, with an introducing unit, one of a marker molecule and a stain into the second tank; irradiating, from a second light source, the second tank with visible light; detecting, with a detector, first intensity of the visible light having transmitted through the second tank; and outputting, when the activity of photocatalytic particles calculated based on the first intensity is equal to or smaller than a second threshold value, information prompting replacement of the photocatalytic particles, an instruction of recovering the activity of the photocatalytic particles, or information indicative of deterioration of the photocatalytic particles.

11 Claims, 8 Drawing Sheets

(58) Field of Classification Search
USPC .......................................................... 210/745
See application file for complete search history.

(56) References Cited

U.S. PATENT DOCUMENTS 6,585,863 B2 * 7/2003 Davydov .................. C02F 1/30
                                                                        204/157.3
2014/0027387 A1    1/2014 Maruo et al.

* cited by examiner

WATER TREATMENT METHOD AND WATER TREATMENT APPARATUS

BACKGROUND

1. Technical Field

The present disclosure relates to a water treatment method and a water treatment apparatus using a photocatalyst.

2. Description of the Related Art

In recent years, there are growing expectations on use of a photocatalyst in water treatment, such as depolluting contaminated water, which is an aqueous solution containing a predetermined contaminating substance. As an apparatus capable of depolluting contaminated water using a photocatalyst, there is proposed a water treatment apparatus that treats continuously supplied contaminated water using a photocatalyst suspended in water (e.g., PTL 1). PTL 1 discloses a water treatment apparatus capable of disinfecting, by suspending microparticles of titanium dioxide or the like in treatment-target water and causing the water to pass around an ultraviolet lamp.

CITATION LIST

Patent Literature

PTL 1: Japanese Patent No. 2125610
PTL 2: Japanese Patent No. 5111690

However, the conventional techniques are silent on the fact that adsorption of metal ions contained in contaminated water being the target of water treatment on the surface of the photocatalytic particles disadvantageously reduces the function of the photocatalytic particles as a photocatalyst. When the function as a photocatalyst reduces, the concentration of the contaminating substance contained in the water having undergone water treatment (post-treatment water) increases. This jeopardizes human health when the water is used as drinking water, for example.

SUMMARY

The present disclosure has been made in view of the foregoing, and one non-limiting and exemplary embodiment provides a water treatment method and a water treatment apparatus capable of preventing a reduction in quality of post-treatment water, which is water having undergone water treatment using a photocatalyst.

In one general aspect, the techniques disclosed here feature a water treatment method using a water treatment apparatus that removes impurities, the method including:

(a) providing the water treatment apparatus;
the water treatment apparatus including
a first tank that stores slurry containing photocatalytic particles,
a first light source that irradiates the photocatalytic particles with ultraviolet light,
a flowmeter that measures an amount of an aqueous solution introduced into the first tank,
an ionic conductivity measuring meter that measures ionic conductivity of the aqueous solution introduced into the first tank,
a second tank into which part of the slurry in the first tank is introduced,
an introducing unit that introduces one of a marker molecule and a stain into the second tank,
a second light source that irradiates the second tank with visible light, and
a detector that detects intensity of the visible light having transmitted through the second tank;

(b) introducing an aqueous solution containing impurities into the first tank;

(c) irradiating, from the first light source, the photocatalytic particles with ultraviolet light, to turn the aqueous solution into post-treatment water in which the impurities have been treated;

(d) measuring, with the flowmeter, an amount of the aqueous solution introduced into the first tank;

(e) measuring, with the ionic conductivity measuring meter, ionic conductivity of the aqueous solution introduced into the first tank;

(f) calculating a total amount of ions contained in a total amount of the aqueous solution introduced into the first tank, using the measured amount of the aqueous solution and the measured ionic conductivity of the aqueous solution;

(g) when the calculated total amount of ions is greater than a first threshold value, introducing part of the slurry in the first tank into the second tank;

(h) introducing, with the introducing unit, one of a marker molecule and a stain into the second tank;

(i) irradiating, from the second light source, the second tank with visible light;

(j) detecting, with the detector, first intensity of the visible light having transmitted through the second tank; and (k) outputting, when the activity of the photocatalytic particles calculated based on the first intensity is equal to or smaller than a second threshold value, information prompting replacement of the photocatalytic particles, an instruction of recovering the activity of the photocatalytic particles, or information indicative of deterioration of the photocatalytic particles.

The water treatment method and the water treatment apparatus of the present disclosure can prevent a reduction in quality of post-treatment water, which is water having undergone water treatment using a photocatalyst.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

Figure 1:
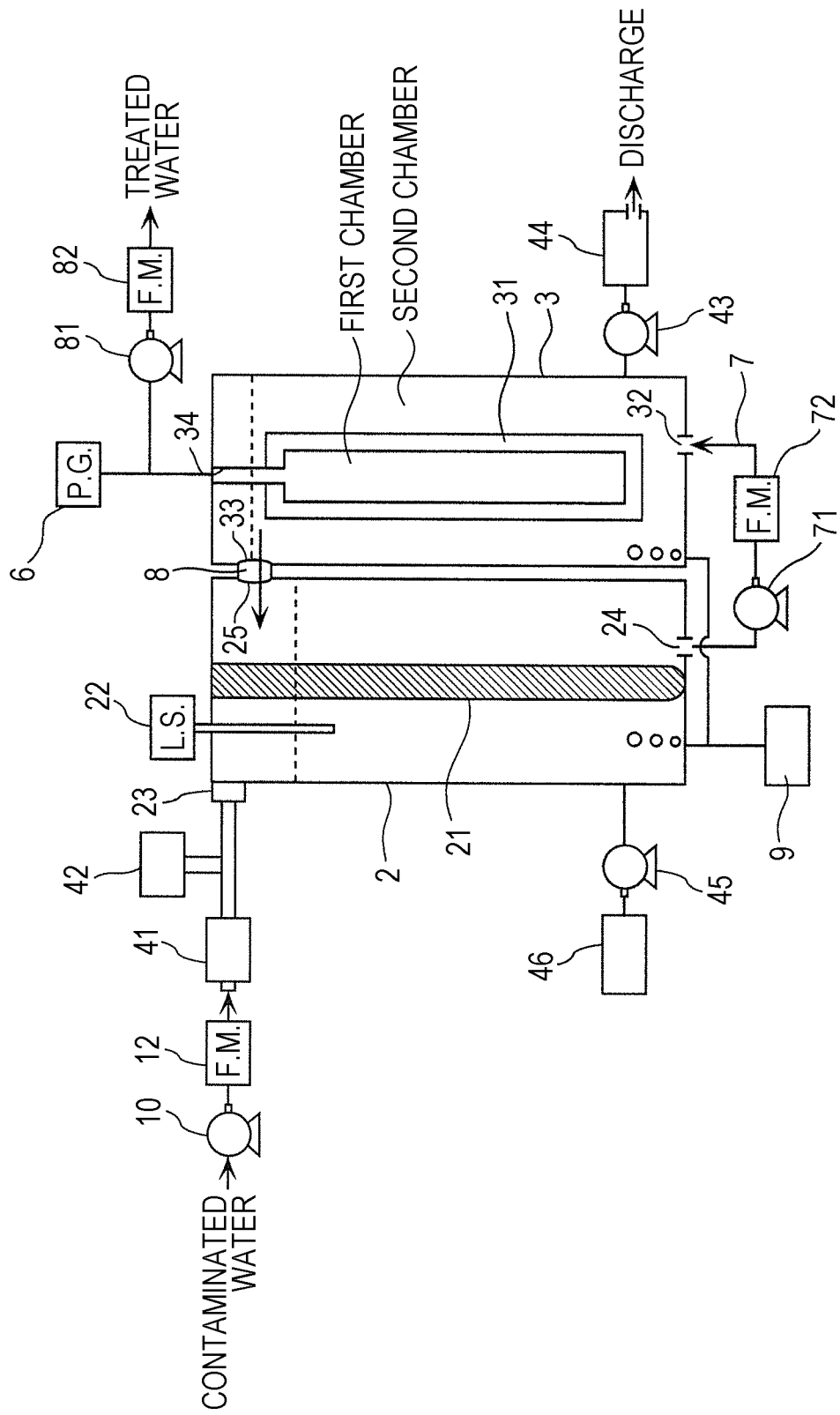
FIG. 1 is a schematic cross-sectional view of an exemplary water treatment apparatus according to an exemplary embodiment.

DETAILED DESCRIPTION (Underlying Knowledge Forming Basis of the Present Disclosure)

A photocatalyst is highly sustainable, for its requiring no chemicals and being reusable. Accordingly, in recent years, there are growing expectations on use of a photocatalyst in water treatment, such as depolluting contaminated water, which is an aqueous solution containing a predetermined contaminating substance.

For example, as described above, PTL 1 discloses a water treatment apparatus that treats continuously supplied contaminated water using a photocatalyst suspended in water. The water treatment apparatus disclosed in PTL 1 is capable of disinfecting, by suspending microparticles of titanium dioxide or the like in treatment-target water and causing the water to pass around an ultraviolet lamp.

Further, for example, PTL 2 discloses a water treatment apparatus that treats contaminated water using photocatalytic particles dispersed in contaminated water, by causing titanium dioxide to adsorb onto the outer surface of zeolite.

On the other hand, with a water treatment apparatus, there are several factors in a reduction in the efficiency of water treatment. Such factors include deterioration of photocatalytic particles because of metal ions contained in contaminated water adsorbing onto the surface of the photocatalytic particles thereby reducing the function as a photocatalyst, and a reduction in the photocatalyst concentration because of accumulation of separated films of the photocatalytic particles.

However, the conventional water treatment apparatuses such as disclosed in PTL 1 and PTL 2 do not deal with the necessity of monitoring the function of the photocatalyst during water treatment.

Further, the conventional water treatment apparatuses are also associated with a problem that there exists no way of knowing if the function of the photocatalyst has reduced through use. Whether the water treating function of the apparatuses is maintained must be examined by separately analyzing post-treatment water. In addition, since there is a gap between the time when contaminated water is treated and the time when the analysis is finished, post-treatment water in which the concentration of a contaminating substance exceeds the reference concentration may be disadvantageously produced.

Still further, there exist apparatuses for analyzing post-treatment water which employ inductively coupled plasma (ICP) or liquid chromatography and are capable of measuring the concentration of a contaminating substance contained in post-treatment water. However, such apparatuses are extremely expensive and require high operation techniques. That is, a water treatment apparatus is assumed to operate as being placed on an outlet of well water, for example. However, it is not practical to check if the water treating function is maintained by measuring the concentration of a contaminating substance in treated water with the above-described apparatuses for analyzing post-treatment water.

Still further, the concentration of metal ions contained in groundwater differs depending on locations. It may also change by time. Accordingly, the degree of deterioration of the photocatalyst cannot be simply estimated from the amount of post-treatment water produced by water treatment of a water treatment apparatus.

Then, in order to suppress a reduction in the function of a photocatalyst while a water treatment apparatus is performing water treatment, the inventors of the present disclosure have devised a water treatment apparatus that can continuously perform treatment so that the concentration of a contaminating substance in treated water is constantly prevented from exceeding a reference value, by previously presuming deterioration in the function of the photocatalyst and recovering the function of the photocatalyst before the function of the photocatalyst so reduces that it does not fulfill the treating performance.

The present disclosure has been made in view of the foregoing, and an object thereof is to provide a water treatment method and a water treatment apparatus capable of preventing a reduction in quality of post-treatment water, which is water having undergone water treatment using a photocatalyst.

In order to achieve the object, a water treatment method according to an exemplary embodiment of the present disclosure provides a water treatment method using a water treatment apparatus that removes impurities, the method including:

(a) providing the water treatment apparatus;

the water treatment apparatus including a first tank that stores slurry containing photocatalytic particles, a first light source that irradiates the photocatalytic particles with ultraviolet light, a flowmeter that measures an amount of an aqueous solution introduced into the first tank, an ionic conductivity measuring meter that measures ionic conductivity of the aqueous solution introduced into the first tank, a second tank into which part of the slurry in the first tank is introduced, an introducing unit that introduces one of a marker molecule and a stain into the second tank, a second light source that irradiates the second tank with visible light, and a detector that detects intensity of the visible light having transmitted through the second tank;

(b) introducing an aqueous solution containing impurities into the first tank;

(c) irradiating, from the first light source, the photocatalytic particles with ultraviolet light, to turn the aqueous solution into post-treatment water in which the impurities have been treated;

(d) measuring, with the flowmeter, an amount of the aqueous solution introduced into the first tank;

(e) measuring, with the ionic conductivity measuring meter, ionic conductivity of the aqueous solution introduced into the first tank;

(f) calculating a total amount of ions contained in a total amount of the aqueous solution introduced into the first tank, using the measured amount of the aqueous solution and the measured ionic conductivity of the aqueous solution;

(g) when the calculated total amount of ions is greater than a first threshold value, introducing part of the slurry in the first tank into the second tank;

(h) introducing, with the introducing unit, one of a marker molecule and a stain into the second tank;

(i) irradiating, from the second light source, the second tank with visible light;

(j) detecting, with the detector, first intensity of the visible light having transmitted through the second tank; and (k) outputting, when the activity of the photocatalytic particles calculated based on the first intensity is equal to or smaller than a second threshold value, information prompting replacement of the photocatalytic particles, an instruction of recovering the activity of the photocatalytic particles, or information indicative of deterioration of the photocatalytic particles.

Here, the water treatment apparatus may further include a third light source that irradiates the second tank with ultraviolet light. The water treatment method may further include (h1) when the stain is introduced into the second tank by the introducing unit, (i1) irradiating, from the third light source, the second tank with ultraviolet light, thereafter irradiating, from the second light source, the second tank with visible light.

Further, the water treatment method may further include:

(l) when the activity of the photocatalytic particles calculated based on the first intensity is greater than the second threshold value, updating, using the first intensity, the first threshold value to a third threshold value with which part of the slurry in the first tank is to be introduced into the second tank next time; and after (d), (e), and (f), (g1) when the calculated amount of ions is greater than the third threshold value, introducing part of the slurry in the first tank into the second tank.

The water treatment method may further include:

when the activity of the photocatalytic particles is greater than the second threshold value, acquiring second intensity of the visible light having transmitted through the second tank that is calculated when the activity of the photocatalytic particles is at a maximum, calculating the third threshold value by multiplying a rate of the first intensity relative to the second intensity by the first threshold value, and updating the first threshold value to the calculated third threshold value.

The water treatment apparatus may further include a cleaning unit that cleans the photocatalytic particles with one of an acid solution and an alkali solution. The water treatment method may further include, in (k), as the instruction of recovering the activity of the photocatalytic particles, outputting to the cleaning unit an instruction of cleaning the photocatalytic particles with one of the acid solution and the alkali solution.

Further, in order to achieve the object, a water treatment apparatus according to an exemplary embodiment of the present disclosure provides a water treatment apparatus including:

a first tank that stores slurry containing photocatalytic particles, and into which an aqueous solution containing impurities is introduced;

a first light source that irradiates the photocatalytic particles with ultraviolet light, to turn the aqueous solution into post-treatment water in which the impurities have been treated;

a flowmeter that measures an amount of the aqueous solution introduced into the first tank;

an ionic conductivity measuring meter that measures ionic conductivity of the aqueous solution introduced into the first tank;

a calculation circuit that calculates a total amount of ions contained in a total amount of the aqueous solution introduced into the first tank, using the measured amount of the aqueous solution and the measured ionic conductivity of the aqueous solution;

a first determination circuit that determines whether or not the calculated total amount of ions is greater than a first threshold value;

a second tank into which part of the slurry in the first tank is introduced;

a pump that introduces part of the slurry in the first tank into the second tank when it is determined that the total amount of ions calculated by the first determination circuit is greater than the first threshold value;

an introducing unit that introduces one of a marker molecule and a stain into the second tank;

a second light source that irradiates the second tank with visible light;

a detector that detects first intensity of the visible light having transmitted through the second tank; and a second determining circuit that outputs, when activity of the photocatalytic particles calculated based on the first intensity is equal to or smaller than a second threshold value, one of information prompting replacement of the photocatalytic particles, an instruction of recovering the activity of the photocatalytic particles, and information indicative of deterioration of the photocatalytic particles.

Here, the water treatment apparatus may further include a third light source that irradiates the second tank with ultraviolet light when the stain is introduced into the second tank by the introducing unit. The second light source may irradiate the second tank with visible light after the third light source irradiates the second tank with ultraviolet light.

The water treatment apparatus may further include an update circuit that updates, when the activity of the photocatalytic particles calculated based on the first intensity is greater than the second threshold value, using the first intensity, the first threshold value to a third threshold value with which part of the slurry in the first tank is to be introduced into the second tank next time. The first determination circuit may determine, when the first threshold value is updated to the third threshold value by the update circuit, whether or not the calculated total amount of ions is greater than the third threshold value. The pump may introduce part of the slurry in the first tank into the second tank when the calculated total amount of ions is greater than the third threshold value.

Further, when the activity of the photocatalytic particles is greater than the second threshold value, the update circuit may acquire second intensity of the visible light having transmitted through the second tank that is calculated when the activity of the photocatalytic particles is at a maximum, the update circuit may calculate the third threshold value by multiplying a rate of the first intensity relative to the second intensity by the first threshold value, and the update circuit may update the first threshold value to the calculated third threshold value.

The water treatment apparatus may further include a cleaning unit that cleans the photocatalytic particles with one of an acid solution and an alkali solution. The second determination circuit may output to the cleaning unit, as the instruction of recovering the activity of the photocatalytic particles, an instruction of cleaning the photocatalytic particles with one of the acid solution and the alkali solution.

Note that, the present disclosure can be implemented not only as an apparatus, but also as an integrated circuit having processing means included in such an apparatus, or as a method including part of the processing means structuring the apparatus as steps. The present disclosure may be realized as a program causing a computer to execute these steps. The present disclosure may be realized as information, data or signals representing the program. Such a program, information, data, and signals may be distributed on a recording medium such as a CD-ROM, or over a communication medium such as the Internet.

In the following, a detailed description will be given of an exemplary embodiment of the present disclosure with reference to the drawings. Note that, the following exemplary embodiment shows one preferred exemplary embodiment of the present disclosure. Numerical values, shapes, materials, constituents, disposition positions and connection manners of constituents, steps, the order of steps and the like in the following exemplary embodiment are merely examples and not intended to limit the present disclosure. Further, among the constituents described in the following exemplary embodiment, those not described in independent claims representing the most generic concept of the present disclosure are described as arbitrary constituents for structuring a more preferable mode.

EXEMPLARY EMBODIMENT

FIG. 1 is a schematic cross-sectional view of water treatment apparatus 1 according to an exemplary embodiment. Water treatment apparatus 1 shown in FIG. 1 includes at least photoreaction tank 2, separation tank 3, flowmeter 41, ionic conductivity measuring apparatus 42, pump 43, photocatalytic activity measuring apparatus 44, and photocatalyst recycling apparatus 46, and removes impurities. More specifically, water treatment apparatus 1 includes photoreaction tank 2, separation tank 3, controller 5 (not shown), pressure gage 6, channel 7, returning passage 8, compressor 9, introducing pump 10, introducing flowmeter 12, light source 21, water level gage 22, contaminated water inlet 23, first outlet 24, first inlet 25, filtering membrane 31, second inlet 32, second outlet 33, treated water outlet 34, flowmeter 41, ionic conductivity measuring apparatus 42, pump 43, photocatalytic activity measuring apparatus 44, pump 45, photocatalyst recycling apparatus 46, circulating pump 71, circulating flowmeter 72, filtering pump 81, and filtering flowmeter 82.

<Photoreaction Tank 2>

As shown in FIG. 1, light source 21 and water level gage 22 are mounted on photoreaction tank 2. Further, photoreaction tank 2 has contaminated water inlet 23, first outlet 24 connected to channel 7, and first inlet 25 connected to returning passage 8. Photoreaction tank 2 is also referred to as the first tank.

In the present exemplary embodiment, photoreaction tank 2 stores slurry containing photocatalytic particles. Further, into photoreaction tank 2, slurry that contains impurities, i.e., contaminated water, is introduced from contaminated water inlet 23 using introducing pump 10 such as a tube pump. In the present specification, the impurities mean substances that are harmful to human as drinking water. The impurities are, for example, metals containing arsenic such as trivalent arsenic or chromium such as hexavalent chromium, halides such as bromic acid, and any substances, in pharmaceuticals or agricultural chemicals, containing organic materials or microbes. The contaminated water is slurry in which impurities are dissolved.

The photocatalytic particles are, for example, titanium oxide such as titanium dioxide or titanium dioxide coupled to particles of zeolite, zinc oxide, tungstic oxide, iron oxide or the like. The photocatalytic particles remove impurities contained in contaminated water by a photocatalytic reaction which takes place upon irradiation of light. More specifically, the photocatalytic particles irradiated with light generate electron-hole pairs which cause an oxidation-reduction reaction with metal ions contained in contaminated water, thereby detoxifying contaminated water. Alternatively, the electron-hole pairs generate hydroxyl radicals in the water, which react with organic materials contained in contaminated water thereby decomposing the organic materials. In the present exemplary embodiment, the photocatalytic particles receive light from light source 21 which will be described later, and treat impurities contained in contaminated water introduced into photoreaction tank 2, to turn the contaminated water into primary post-treatment water. Note that, the primary post-treatment water is an aqueous solution that contains photocatalytic particles (slurry) and post-treatment impurities, and discharged from first outlet 24 to channel 7. Removing impurities contained in contaminated water means detoxifying impurities contained in contaminated water by an oxidation-reduction reaction. When impurities are organic materials, removing impurities also means decomposing the impurities (organic materials), thereby generating an aqueous solution containing detoxified impurities. The primary post-treatment water contains the photocatalytic particles, and ions and decomposition products after an oxidation-reduction reaction. Further, the photocatalytic particles are not limited to these examples, and other known photocatalyst may be used so long as it is capable of flowing inside water treatment apparatus 1 and treating impurities contained in contaminated water by a photocatalytic reaction.

Further, concentrated water in separation tank 3, that is, an aqueous solution (slurry) in which secondary post-treatment water is separated from the primary post-treatment water and in which concentration of the photocatalytic particles is increased, is introduced (returned) into photoreaction tank 2 from first inlet 25.

<Light Source 21>

Light source 21 is, for example, a low pressure mercury lamp, a medium pressure mercury lamp, a high pressure mercury lamp, an excimer lamp, a xenon lamp, sunbeam, black light, or an LED.

In the present exemplary embodiment, as shown in FIG. 1, light source 21 is disposed inside photoreaction tank 2, and has a circular cylindrical shape which is continuous from the upper surface to the bottom surface of photoreaction tank 2. Light source 21 irradiates the photocatalytic particles in photoreaction tank 2 with ultraviolet light. Here, the ultraviolet wavelength range is, for example, from 200 nm to 400 nm inclusive. Light source 21 may emit any of monochromatic light and continuous light.

For example when the material of the photocatalytic particles is titanium dioxide, light source 21 irradiates the photocatalytic particles with light having an ultraviolet wavelength range, thereby generating hydroxyl radicals. The generated hydroxyl radicals react with the removal target substance, whereby impurities can be removed from contaminated water.

Note that, light source 21 is not limited to be disposed inside photoreaction tank 2. Light source 21 may be disposed outside photoreaction tank 2. In this case, light source 21 should be capable of emitting light toward the photocatalytic particles in photoreaction tank 2 transmitting through the material of photoreaction tank 2.

<Separation Tank 3>

As shown in FIG. 1, separation tank 3 has filtering membrane 31, a first chamber surrounded by filtering membrane 31, and a second chamber not surrounded by filtering membrane 31. Separation tank 3 has second inlet 32 connected to channel 7, second outlet 33 connected to returning passage 8, and treated water outlet 34. Separation tank 3 is connected to photoreaction tank 2 via second inlet 32 and channel 7. The primary post-treatment water is introduced, from photoreaction tank 2 via channel 7, into separation tank 3 from second inlet 32. The second chamber stores the primary post-treatment water.

Filtering membrane 31 is, for example, a hollow fiber membrane or a flat membrane, and has a plurality of pores being smaller in diameter than the above-described photocatalytic particles. Filtering membrane 31 divides the inside of separation tank 3 into the first chamber and the second chamber.

The first chamber is the region surrounded by filtering membrane 31 inside separation tank 3, and has treated water outlet 34. The second chamber is the region except for the first chamber and filtering membrane 31 inside separation tank 3 (the region not surrounded by filtering membrane 31), and has second inlet 32 and second outlet 33.

By filtering pump 81 reducing the pressure in the first chamber, filtering membrane 31 can separate primary post-treatment water stored in the second chamber into the photocatalytic particles stopped at filtering membrane 31 and secondary post-treatment water that passes through filtering membrane 31 and does not contain the photocatalytic particles. That is, filtering the primary post-treatment water with filtering membrane 31 stops the photocatalytic particles at filtering membrane 31. Accordingly, in the first chamber, the secondary post-treatment water having passed through filtering membrane 31 and not containing the photocatalytic particles is stored. By filtering pump 81 further reducing the pressure in the first chamber, the secondary post-treatment water stored in the first chamber is discharged as treated water outside water treatment apparatus 1 from treated water outlet 34. Note that, since the photocatalytic particles are stopped at filtering membrane 31, slurry (concentrated water) containing the photocatalytic particles whose concentration is increasing is stored in the second chamber of separation tank 3. Accordingly, separation tank 3 discharges (returns) the concentrated water, which is slurry obtained from separating the secondary post-treatment water from the primary post-treatment water and contains the photocatalytic particles of an increased concentration, to returning passage 8 from second outlet 33.

In this manner, in separation tank 3, filtering with filtering membrane 31 can extract the secondary post-treatment water not containing the photocatalytic particles from the primary post-treatment water. More specifically, in separation tank 3, by filtering pump 81 reducing the pressure inside filtering membrane 31 (the first chamber) in the state where filtering membrane 31 is immersed in the primary post-treatment water stored in the second chamber, the secondary post-treatment water not containing the photocatalytic particles can be drawn into the first chamber. This is because the photocatalytic particles contained in the primary post-treatment water are greater in diameter than the pores of filtering membrane 31, and therefore the photocatalytic particles cannot pass filtering membrane 31.

<Channel 7 and Returning Passage 8>

As described above, photoreaction tank 2 and separation tank 3 are connected to each other via channel 7 and returning passage 8. More specifically, channel 7 connects first outlet 24 of photoreaction tank 2 and second inlet 32 of separation tank 3 to each other. Further, in channel 7, circulating pump 71 and circulating flowmeter 72, whose description will be given later, are disposed. Channel 7 transfers, with circulating pump 71, the primary post-treatment water discharged from first outlet 24 of photoreaction tank 2 to second inlet 32 of separation tank 3.

Returning passage 8 connects first inlet 25 of photoreaction tank 2 and second outlet 33 of separation tank 3 to each other. The water level of separation tank 3 is adjusted to become higher than that of photoreaction tank 2. Accordingly, the concentrated water discharged from second outlet 33 of separation tank 3 is transferred through returning passage 8 to first inlet 25 of photoreaction tank 2.

<Circulating Pump 71>

Circulating pump 71 is disposed in channel 7, and introduces the primary post-treatment water discharged from first outlet 24 of photoreaction tank 2 into second inlet 32 of separation tank 3. Circulating pump 71 is, for example, a tube pump. The tube pump is a known pump, and therefore a detailed description thereof is omitted. In a tube pump, an elastic tube is squeezed with a roller so that liquid can be pushed out.

<Filtering Pump 81>

Filtering pump 81 is disposed in the channel connected to treated water outlet 34, and is a tube pump, for example.

Filtering pump 81 serves to reduce the pressure, thereby separating with filtering membrane 31 the photocatalytic particles and water not containing the photocatalytic particles from each other. That is, filtering pump 81 reduces the pressure in the first chamber, thereby causing the photocatalytic particles contained in the primary post-treatment water to stop at filtering membrane 31, and causes the secondary post-treatment water, which is part of the primary post-treatment water and does not contain the photocatalytic particles, to pass through filtering membrane 31.

More specifically, filtering pump 81 reduces the pressure inside filtering membrane 31 (the first chamber), thereby drawing the secondary post-treatment water, which is obtained by filtering the primary post-treatment water stored in the second chamber of separation tank 3 with filtering membrane 31, into the first chamber. Since filtering pump 81 continuously reduces the pressure in the first chamber, the secondary post-treatment water stored in the first chamber is discharged as the treated water outside water treatment apparatus 1 from treated water outlet 34.

In the present exemplary embodiment, filtering pump 81 controls pressure such that the flow rate of the treated water (the secondary post-treatment water) discharged from treated water outlet 34 maintains a constant value. Here, for example, filtering pump 81 may have a filtering pump controller. The filtering pump controller may receive (acquire) information on the flow rate from filtering flowmeter 82 that is disposed in a channel connected to treated water outlet 34 and measures the flow rate of the discharged secondary post-treatment water, and control itself (filtering pump 81) such that the flow rate maintains a constant value.

Note that, the size of the pores of filtering membrane 31 is just required to be small enough to block the photocatalytic particles. The size of the photocatalytic particles and filtering efficiency are concerned. That is, great pores of filtering membrane 31 permit the photocatalytic particles to pass through; and excessively small pores necessitate an increase in draw-in pressure, which puts excessive load on filtering pump 81. Taking into consideration of the foregoing, the size of the pores of filtering membrane 31 is, for example, from 10 nm to 100 nm inclusive.

<Compressor 9>

During its operation, compressor 9 supplies air to photoreaction tank 2 and separation tank 3. The supplied air agitates the slurry stored in photoreaction tank 2 and separation tank 3. That is, compressor 9 supplies air to photoreaction tank 2 and separation tank 3, and bubbles generated thereby prevent precipitation of the photocatalytic particles, remove the photocatalytic particles attached to filtering membrane 31, and supply oxygen required for the photocatalyst to generate hydroxyl radicals.

Further, compressor 9 can supply air to filtering membrane 31 of separation tank 3.

<Pressure Gage 6>

As shown in FIG. 1, pressure gage 6 is disposed at a channel between filtering membrane 31 and filtering pump 81, and used to monitor the filtering pressure. From an increase in the filtering pressure, an occurrence of a problem such as clogging of filtering membrane 31 or the like can be detected.

<Flowmeter 41>

Flowmeter 41 is disposed between introducing pump 10 and contaminated water inlet 23, and measures the amount of contaminated water introduced into photoreaction tank 2. Note that, flowmeter 41 may be provided separately from introducing flowmeter 12, or may be integrated with introducing flowmeter 12.

In the present exemplary embodiment, flowmeter 41 successively transmits the measurement result to controller 5.

<Ionic Conductivity Measuring Apparatus 42>

Figure 2:
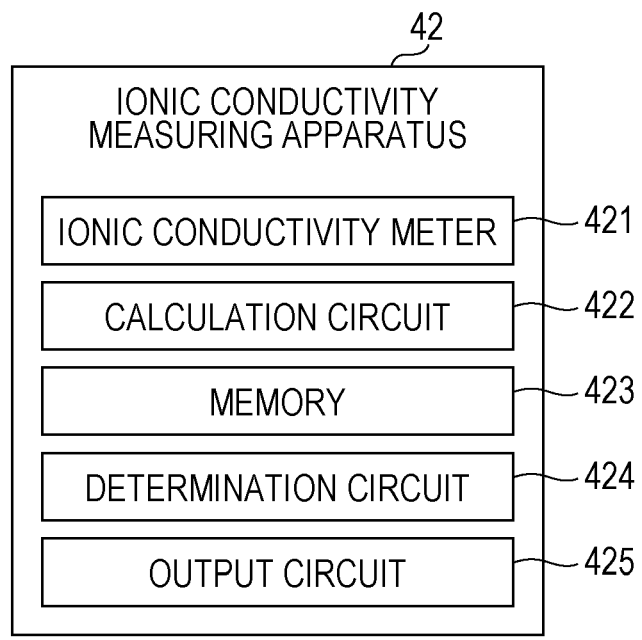
FIG. 2 is a block diagram showing an exemplary functional structure of an ionic conductivity measuring apparatus according to the exemplary embodiment.

FIG. 2 is a block diagram showing an exemplary functional structure of ionic conductivity measuring apparatus 42 according to the exemplary embodiment.

As shown in FIG. 2, ionic conductivity measuring apparatus 42 according to the present exemplary embodiment includes ionic conductivity meter 421, calculation circuit 422, memory 423, determination circuit 424, and output circuit 425.

Ionic conductivity meter 421 is also referred to as an ionic conductivity measuring meter, and measures the amount of ions contained in contaminated water introduced into photoreaction tank 2. Specifically, ionic conductivity meter 421 continuously measures the ionic conductivity of contaminated water.

Calculation circuit 422 calculates the total amount of ions contained in the total amount of contaminated water introduced into photoreaction tank 2, using the amount of contaminated water measured by flowmeter 41 and the ionic conductivity of the contaminated water measured by ionic conductivity meter 421. Here, calculation circuit 422 may calculate concentration of ions contained in the contaminated water based on the ionic conductivity value measured by flowmeter 41 and a table showing the relationship between the concentration of ions contained in groundwater and ionic conductivity. Further, calculation circuit 422 may calculate the total amount of ions having flowed into photoreaction tank 2, from the temporal change in the concentration of ions contained in the contaminated water and the temporal accumulation value thereof, and the total amount of the contaminated water having flowed into photoreaction tank 2.

Determination circuit 424 is also referred to as, for example, a first determination circuit, and determines whether or not the total amount of ions calculated by calculation circuit 422 is greater than a first threshold value. Here, the first threshold value is the threshold value at which part of the aqueous solution of photoreaction tank 2 is to be introduced into photocatalytic activity measuring apparatus 44 (measurement tank 441). The first threshold value is stored in memory 423. More specifically, the first threshold value is the value at which the activity of the photocatalytic particles does not fulfill the performance. It is known that the ion relating to deterioration of the function of the photocatalytic particles is calcium. Further, from basic study, the amount of Ca that impairs the function of the photocatalytic particles is known. Based on this Ca amount, the first threshold value is determined. Note that, while the total amount of ions having flowed into photoreaction tank 2 can be calculated using ionic conductivity meter 421, the concentration of ions of several kinds cannot be individually obtained. Accordingly, the first threshold value is determined based on that the maximum value of calcium amount having flowed in is 50% as great as the calculated total amount of ions.

Memory 423 is, for example, HDD (Hard Disk Drive), nonvolatile memory, or RAM, and stores the table showing the relationship between the ion concentration in groundwater and ionic conductivity, and the first threshold value. Further, memory 423 is also used when calculation circuit 422 calculates the total amount of ions, and stores the temporal change in concentration of ions contained in the contaminated water and temporal accumulation value thereof.

When determination circuit 424 determines that the total amount of ions calculated by calculation circuit 422 is greater than the first threshold value, output circuit 425 should issue an alert signal to controller 5.

<Photocatalyst Recycling Apparatus 46>

Photocatalyst recycling apparatus 46 is also referred to as a cleaning unit, and recovers the function of photocatalytic particles whose activity has reduced. More specifically, photocatalyst recycling apparatus 46 cleans the photocatalytic particles with an acid solution or an alkali solution, thereby recovering the photocatalytic particles. In the present exemplary embodiment, when photocatalyst recycling apparatus 46 is instructed from controller 5, which will be described later, to clean the photocatalytic particles with an acid solution or an alkali solution for recovering the activity of the photocatalytic particles, photocatalyst recycling apparatus 46 adds an acid solution or an alkali solution to the photocatalytic particles collected at photocatalyst recycling apparatus 46 to clean the photocatalytic particles, thereby recovering (recycling) the function of the photocatalytic particles. The cleaned photocatalytic particles are returned to photoreaction tank 2 for use. Here, acid is, for example, citric acid, hydrochloric acid, sulfuric acid, or nitric acid. Alkali is, for example, ammonia, or sodium hydroxide.

While a description will be given later, when the first threshold value is updated to a third threshold value, determination circuit 424 should determine whether or not the total amount of ions calculated by calculation circuit 422 is greater than the third threshold value. The rest of the operation is as described above, and therefore a further description will not be given.

Further, photocatalyst recycling apparatus 46 is not limited to recycling the photocatalytic particles by cleaning with an acid solution or an alkali solution, and photocatalyst recycling apparatus 46 may recycle the photocatalytic particles by replacing the photocatalytic particles with new photocatalytic particles.

<Pump 43>

Pump 43 is disposed between photocatalytic activity measuring apparatus 44 and photoreaction tank 2 (or separation tank 3), and introduces part of the aqueous solution (slurry) in photoreaction tank 2 into photocatalytic activity measuring apparatus 44. In the present exemplary embodiment, when ionic conductivity measuring apparatus 42 determines that the total amount of ions is greater than the first threshold value and issues an alert signal, pump 43 introduces part of the slurry in photoreaction tank 2 into photocatalytic activity measuring apparatus 44 (measurement tank 441). Here, pump 43 is, for example, a tube pump. The tube pump is a known pump, and therefore a detailed description thereof is omitted. In a tube pump, an elastic tube is squeezed with a roller so that liquid can be pushed out.

<Photocatalytic Activity Measuring Apparatus 44>

Figure 3:
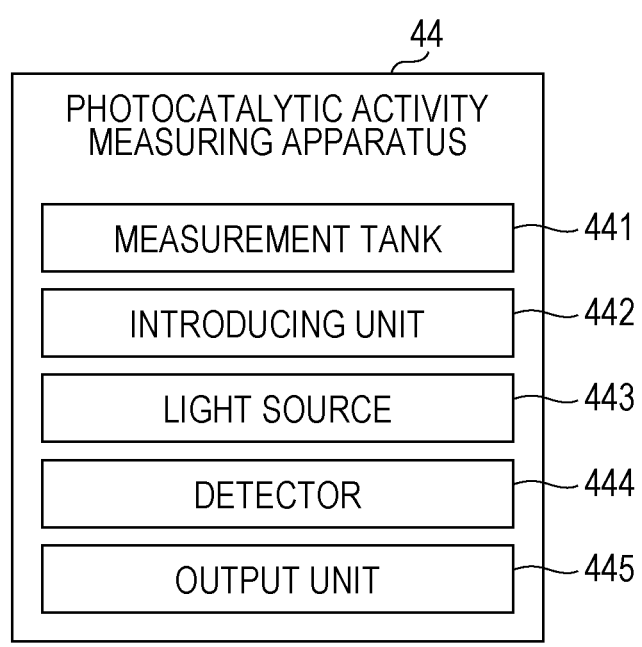
FIG. 3 is a block diagram showing an exemplary functional structure of a photocatalytic activity measuring apparatus according to the exemplary embodiment.

FIG. 3 is a block diagram showing an exemplary functional structure of photocatalytic activity measuring apparatus 44 according to the exemplary embodiment.

As shown in FIG. 3, photocatalytic activity measuring apparatus 44 includes measurement tank 441, introducing unit 442, light source 443, detector 444, and output unit 445. Photocatalytic activity measuring apparatus 44 according to the present exemplary embodiment measures the activity of the photocatalytic particles using marker molecules or a stain.

Measurement tank 441 is also referred to as a second tank, and part of the aqueous solution (slurry) in photoreaction tank 2 is introduced into measurement tank 441. In the present exemplary embodiment, when ionic conductivity measuring apparatus 42 issues an alert signal, pump 43 controlled by controller 5 may introduce part of the secondary post-treatment water in separation tank 3 into measurement tank 441 as part of the slurry in photoreaction tank 2. Since the slurry in photoreaction tank 2 is introduced into separation tank 3 via channel 7, the aqueous solution in photoreaction tank 2 and part of the secondary post-treatment water in separation tank 3 are an identical liquid.

When part of the secondary post-treatment water in separation tank 3 is introduced into measurement tank 441 as part of the aqueous solution in photoreaction tank 2, introducing unit 442 introduces marker molecules or a stain into measurement tank 441. Introducing unit 442 is, for example, an automatic pipettor, and adds marker molecules or a stain to a liquid that contains the photocatalytic particles and is introduced into measurement tank 441. Here, the marker molecules are phenanthroline that develops color upon a reaction with divalent iron contained in water, and the stain is a stain formed by an organic material, and for example, methylene blue.

Light source 443 irradiates measurement tank 441 with at least visible light.

Detector 444 detects the intensity of visible light (first intensity) transmitted through measurement tank 441. In the present exemplary embodiment, detector 444 may obtain absorbance using information on the intensity of visible light output from light source 443 and intensity of visible light transmitted through the liquid in measurement tank 441.

Here, when the photocatalytic particles are functioning, iron in water is reduced and becomes divalent. When phenanthroline is introduced into measurement tank 441 by introducing unit 442, detector 444 can measure the concentration of divalent iron in water by measuring absorbance. Since there exists correlation between absorbance and the activity of the photocatalytic particles, that is, the activity of the photocatalytic particles is higher when absorbance is greater, measuring the concentration of divalent iron in water can measure the activity of the photocatalytic particles. Note that, when the contaminated water does not contain trivalent iron, trivalent iron should be intentionally added to the contaminated water (or photoreaction tank 2).

Output unit 445 outputs information indicative of the first intensity detected (or the absorbance calculated) by detector 444 to controller 5.

Note that, when a stain is introduced by introducing unit 442, light source 443 must firstly irradiates measurement tank 441 with ultraviolet rays and then with visible light. In the following, the structure in this case is specifically described with reference to the drawings.

Figure 4A:
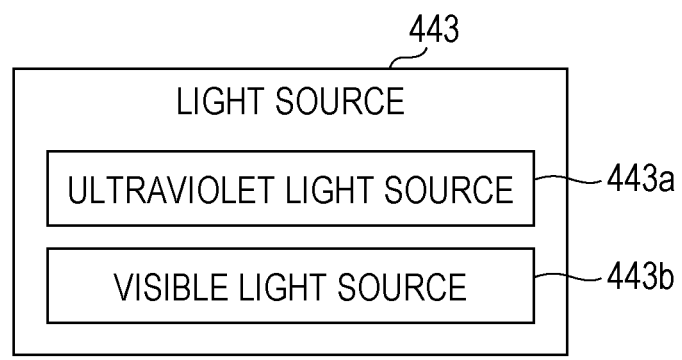
FIG. 4A is a block diagram showing an exemplary detailed functional structure of a light source shown in FIG. 3.
Figure 4B:
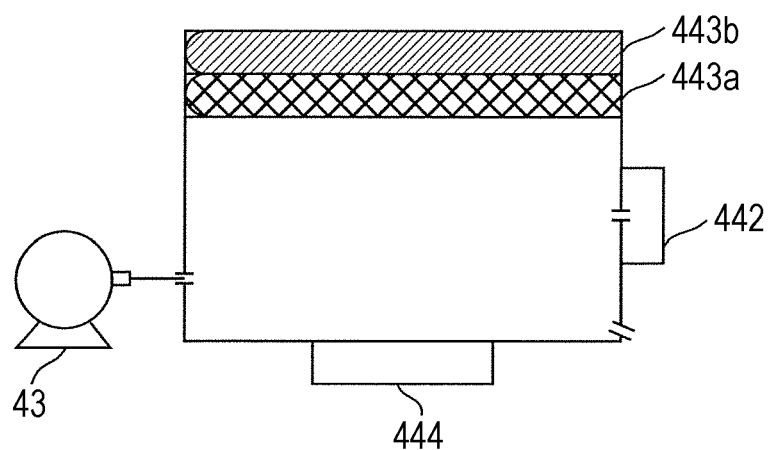
FIG. 4B is an exemplary structure diagram of the photocatalytic activity measuring apparatus including the light source shown in FIG. 4A.
Figure 5A:
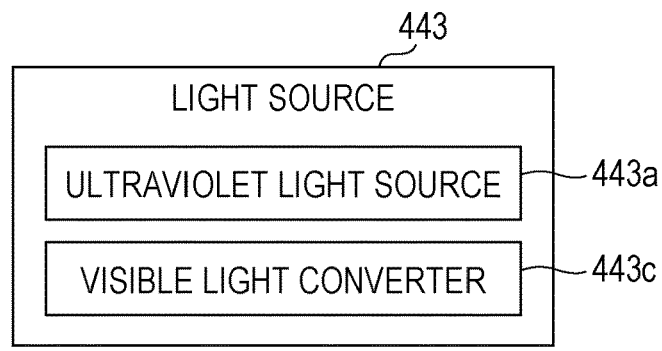
FIG. 5A is a block diagram showing another exemplary detailed functional structure of the light source shown in FIG. 3.
Figure 5B:
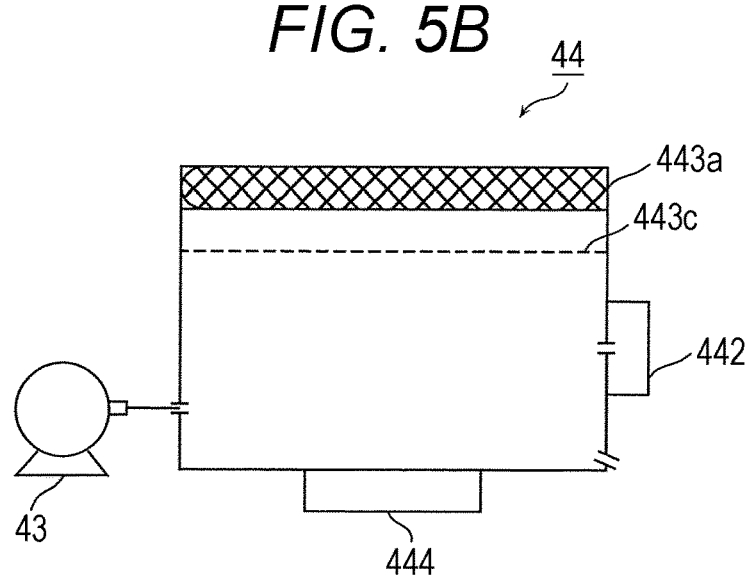
FIG. 5B is an exemplary structure diagram of the photocatalytic activity measuring apparatus including the light source shown in FIG. 5A.

FIG. 4A is a block diagram showing an exemplary detailed functional structure of light source 443 shown in FIG. 3. FIG. 4B is an exemplary structure diagram of photocatalytic activity measuring apparatus 44 including light source 443 shown in FIG. 4A. FIG. 5A is a block diagram showing another exemplary detailed functional structure of light source 443 shown in FIG. 3. FIG. 5B is an exemplary structure diagram of photocatalytic activity measuring apparatus 44 including light source 443 shown in FIG. 5A. Note that, the elements similar to those in FIG. 3 are denoted by identical reference characters, and the detailed description thereof will not be repeated.

As shown in FIG. 4A, light source 443 may include ultraviolet light source 443a and visible light source 443b. Ultraviolet light source 443a is also referred to as a third light source, and irradiates measurement tank 441 with ultraviolet light. Visible light source 443b is also referred to as a second light source, and after ultraviolet light source 443a has irradiated measurement tank 441 with ultraviolet light, visible light source 443b irradiates measurement tank 441 with visible light. More specifically, when a stain is introduced to measurement tank 441 by introducing unit 442, light source 443 firstly causes ultraviolet light source 443a to irradiate measurement tank 441, so that the photocatalytic particles in measurement tank 441 are irradiated with ultraviolet rays and the stain is decomposed. Next, ultraviolet light source 443a is switched to visible light source 443b, and visible light source 443b irradiates measurement tank 441 with visible light. Then, detector 444 should detect the intensity of visible light having transmitted through measurement tank 441 (the first intensity). Since the amount of decomposed stain changes depending on the activity of the photocatalytic particles, measuring, with absorbance, the concentration of the stain having undergone irradiation with light for a certain period can measure the activity of the photocatalytic particles. In this case, there exists correlation between absorbance and the activity of the photocatalytic particles, that is, the activity of the photocatalytic particles is higher when absorbance is smaller.

Note that, as shown in FIG. 4A, light source 443 is not limited to include ultraviolet light source 443a and visible light source 443b. For example, as shown in FIG. 5A, light source 443 may include ultraviolet light source 443a and visible light converter 443c. In this case, visible light converter 443c is, for example, a variable filter. Causing ultraviolet light emitted from ultraviolet light source 443a to pass through filter converts the ultraviolet light into visible light. The rest of the operation is as described above, and therefore a further description will not be given.

<Controller 5>

Figure 6:
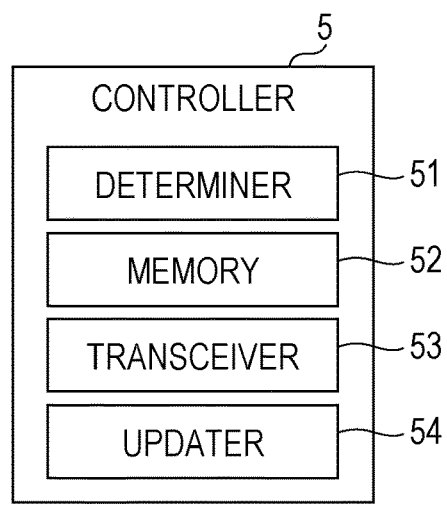
FIG. 6 is a block diagram showing an exemplary functional structure of a controller according to the exemplary embodiment.

FIG. 6 is a block diagram showing an exemplary functional structure of controller 5 according to the exemplary embodiment.

Controller 5 is included in water treatment apparatus 1 (not shown), and implemented by a semiconductor integrated circuit (IC), for example. As shown in FIG. 6, controller 5 according to the present exemplary embodiment includes determiner 51, memory 52, transceiver 53, and updater 54.

Determiner 51 is also referred to as a second determination circuit. Determiner 51 determines whether the activity of the photocatalytic particles calculated based on the first intensity received at transceiver 53 is equal to or smaller than a second threshold value. When the activity of the photocatalytic particles is equal to or smaller than the second threshold value, determiner 51 causes transceiver 53 to output information that prompts replacement of the photocatalytic particles, an instruction of recovering the activity of photocatalytic particles, or information indicative of deterioration of the photocatalytic particles. The information indicative of deterioration of the photocatalytic particles includes, in the case where display showing that the photocatalytic particles are not deteriorating (first display) is presented when the activity of the photocatalyst is greater than the second threshold value, turning off the first display when the activity of the photocatalytic particles is equal to or smaller than the second threshold value. The second threshold value is stored in memory 52.

Note that, determiner 51 may compare absorbance with a threshold value stored in memory 52, and when the absorbance is greater than the threshold value, determiner 51 may cause transceiver 53 to output an instruction of continuing operation; when the absorbance is equal to or smaller than the threshold value, determiner 51 may cause transceiver 53 to output an instruction of performing a photocatalyst function recovering operation.

Memory 52 is, for example, HDD (Hard Disk Drive), nonvolatile memory, or RAM, and stores the second threshold value. The second threshold value is a value which enables to make a determination that the activity of the photocatalytic particles has reduced and the function must be recovered.

Transceiver 53 receives an alert signal from ionic conductivity measuring apparatus 42 and the first intensity or absorbance as the measurement result of photocatalytic activity measuring apparatus 44. Further, when an alert signal is issued from ionic conductivity measuring apparatus 42, transceiver 53 transmits, to pump 43, a signal indicative of introducing part of the aqueous solution (slurry) in photoreaction tank 2 into photocatalytic activity measuring apparatus 44 (measurement tank 441). Further, transceiver 53 transmits, to pump 45, a signal indicative of collecting the slurry containing the photocatalytic particles in photoreaction tank 2 to photocatalyst recycling apparatus 46, or transmitting, to photocatalytic activity measuring apparatus 44, an instruction of cleaning the photocatalytic particles with an acid solution or alkali solution as the instruction of recovering the activity of the photocatalytic particles. Further, transceiver 53 may transmit information of updating the first threshold value stored in ionic conductivity measuring apparatus 42 to the third threshold value.

Updater 54 is also referred to as an update circuit, and when the activity of the photocatalytic particles calculated based on the first intensity received at transceiver 53 is greater than the second threshold value, updater 54 updates the first threshold value to the third threshold value using the first intensity. Here, the third threshold value is the threshold value at which part of the slurry in photoreaction tank 2 is to be introduced into measurement tank 441 next time.

More specifically, when the activity of the photocatalytic particles is greater than the second threshold value, updater 54 acquires the second intensity of visible light having transmitted through measurement tank 441 which is calculated when the activity of the photocatalytic particles is at the maximum, and multiplies the rate of the first intensity relative to the second intensity by the first threshold value, thereby obtaining the third threshold value. Then, updater 54 updates the first threshold value to the calculated third threshold value.

[Operation of Water Treatment Apparatus 1]

Next, a description will be given of the operation of water treatment apparatus 1 structured as described above.

<Flow of Water Treatment>

Firstly, with reference to FIGS. 7 and 8, a description will be given of the operation of water treatment apparatus 1.

Figure 7:
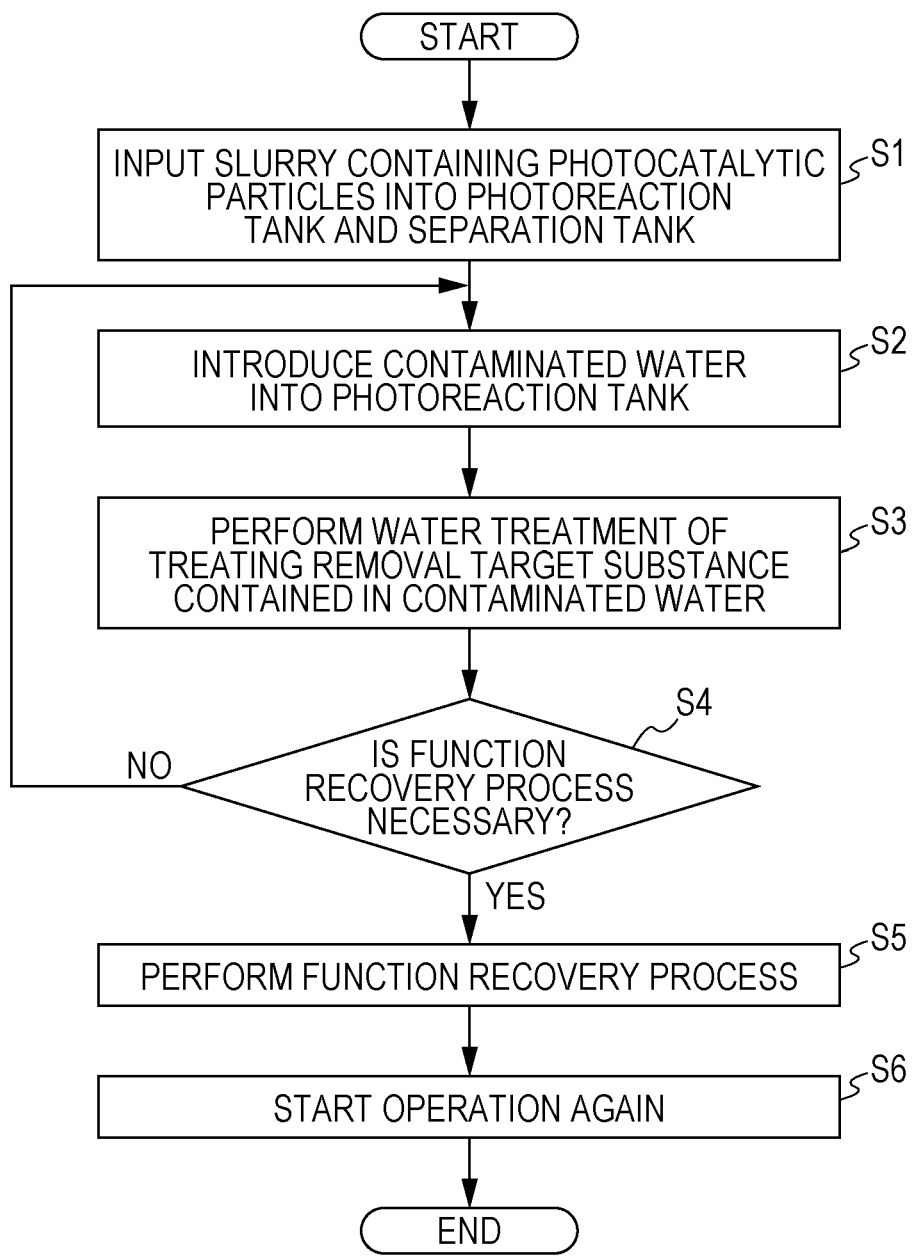
FIG. 7 is a diagram showing the overview of the operation flow of the water treatment apparatus according to the exemplary embodiment.
Figure 8:
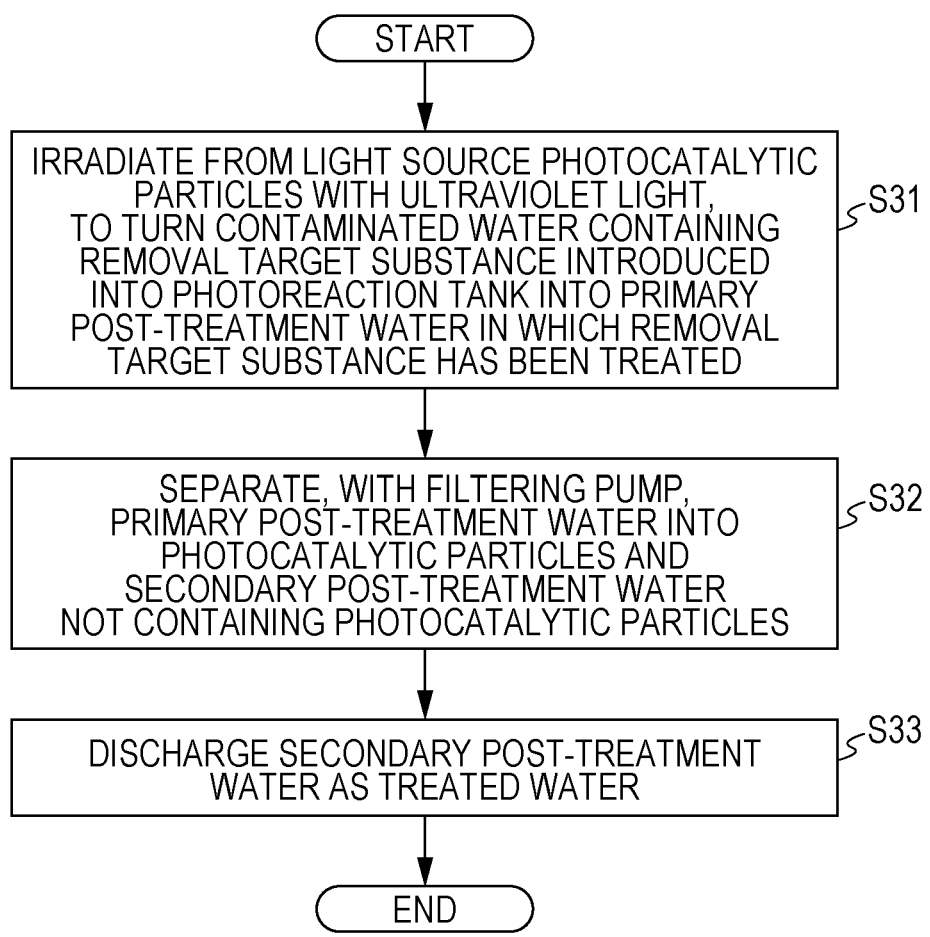
FIG. 8 is a diagram showing a detailed operation of the water treatment flow of the water treatment apparatus according to the exemplary embodiment.

FIG. 7 is a diagram showing the overview of the operation flow of water treatment apparatus 1 according to the present exemplary embodiment. FIG. 8 is a diagram showing a detailed operation of the water treatment flow of the water treatment apparatus according to the present exemplary embodiment.

Firstly, water treatment apparatus 1 is provided. Specifically, the user of water treatment apparatus 1 purchases water treatment apparatus 1.

Next, slurry containing photocatalytic particles is input to photoreaction tank 2 and separation tank 3 (S1). When the slurry is input, compressor 9 operates to send air to photoreaction tank 2 and separation tank 3, thereby agitating the slurry. Subsequently, circulating pump 71 is turned ON, and the slurry is circulated in photoreaction tank 2. Further, light source 21 is turned ON, and stands by so that an oxidation-reduction reaction by the photocatalyst takes place once contaminated water is introduced into photoreaction tank 2.

Next, the contaminated water is introduced into photoreaction tank 2 (S2). Specifically, the contaminated water is introduced, for example, from an external container that stores the contaminated water, into contaminated water inlet 23 of photoreaction tank 2 by introducing pump 10.

Next, since light source 21 is ON and the slurry stored in photoreaction tank 2 is irradiated with ultraviolet rays, water treatment apparatus 1 performs water treatment of treating impurities contained in the contaminated water (S3). In more detail, as shown in FIG. 8, firstly, water treatment apparatus 1 causes light source 21 to irradiate the photocatalytic particles in photoreaction tank 2 with ultraviolet light, and turns the contaminated water containing impurities introduced into photoreaction tank 2 into primary post-treatment water in which the impurities have been treated, by a photocatalytic reaction of the photocatalytic particles (S31). The primary post-treatment water is sent to separation tank 3 by circulating pump 71. Subsequently, water treatment apparatus 1 separates the primary post-treatment water, which is discharged from photoreaction tank 2 and introduced into separation tank 3 by filtering pump 81 reducing the pressure in the first chamber, into the photocatalytic particles (slurry) stopped at filtering membrane 31 and secondary post-treatment water being an aqueous solution that passes through filtering membrane 31 and contains no photocatalytic particles (S32). Subsequently, water treatment apparatus 1 discharges the secondary post-treatment water as treated water to the outside of water treatment apparatus 1 (S33). The slurry left in separation tank 3 containing the photocatalytic particles of an increased concentration (concentrated water) is returned to photoreaction tank 2 through returning passage 8. Since Steps S31 to S33 are detailed in the foregoing, the description thereof is not repeated.

Next, water treatment apparatus 1 determines whether or not the function recovery process is necessary (S4).

In Step S4, when it is determined that the function recovery process is not necessary (No in S4), control returns to Step S2. Note that, in this case, by continuously performing Steps S2 and S3, continuous water treatment can be performed.

On the other hand, in Step S4, when it is determined that the function recovery process is necessary (Yes in S4), the operation of water treatment apparatus 1 is temporarily stopped and the function recovery process is performed (S5). Then, after the function recovery process ends, the operation of the water treatment apparatus 1 is again started (S6).

In this manner, water treatment apparatus 1 according to the present exemplary embodiment irradiates the photocatalytic particles with excitation light (ultraviolet light) in the state where the photocatalytic particles are dispersed in the liquid in photoreaction tank 2 (in the state of slurry). Thus, as compared to the scheme in which the photocatalytic particles are used as being fixed to the inner wall of photoreaction tank 2 or the like, the reaction efficiency is at least decupled. When the concentration of the photocatalytic particles used as being dispersed reduces, the occurrence of photocatalytic reactions reduces, and hence the reaction efficiency disadvantageously reduces. On the other hand, an excessively high concentration of the photocatalytic particles reduces the light transmittance of the slurry, and hence the reaction efficiency disadvantageously reduces. The concentration of the photocatalytic particles in photoreaction tank 2 preferably falls within the range from 0.1 g/L to 4 g/L.

<Process of Determining Function Recovery Process>

Next, with reference to FIG. 9, a description will be given of the process of determining in Step S4 in FIG. 7.

Figure 9:
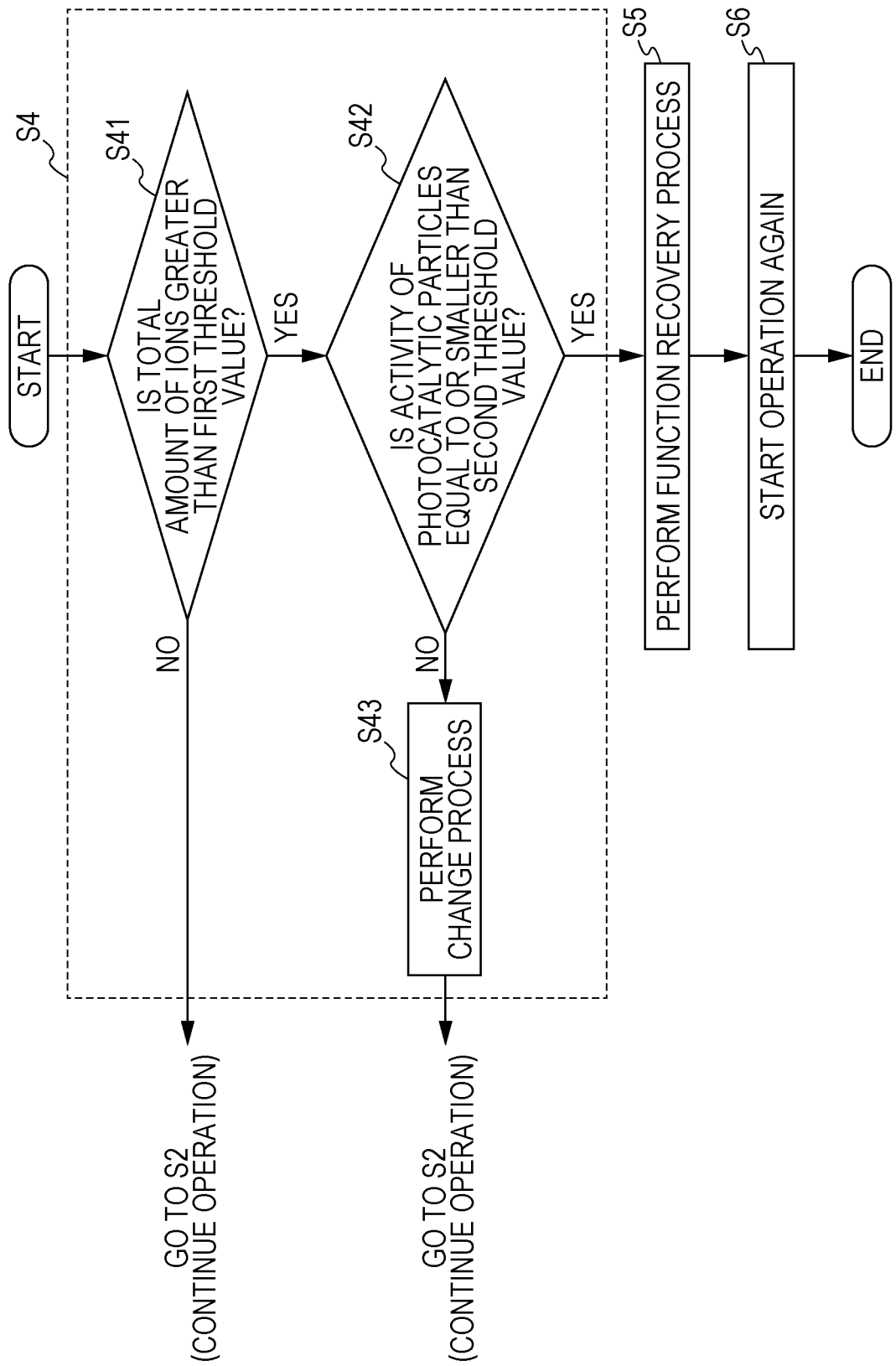
FIG. 9 is a diagram showing a detail of the process of determining the function recovery process for the water treatment apparatus according to the exemplary embodiment.

FIG. 9 is a diagram showing a detail of the process of determining the function recovery process for water treatment apparatus 1 according to the present exemplary embodiment.

In Step S4, firstly, water treatment apparatus 1 determines whether or not the calculated total amount of ions is greater than the first threshold value (S41).

More specifically, water treatment apparatus 1 cumulatively adds the amounts of ions introduced into water treatment apparatus 1, from the table showing the relationship between the concentration of ions in groundwater and ionic conductivity, and the total amount (total volume) of the introduced contaminated water, using the amount of contaminated water measured by flowmeter 41 and the ionic conductivity of the contaminated water measured by ionic conductivity meter 421. In this manner, water treatment apparatus 1 calculates the total amount of ions contained in the total amount of the contaminated water introduced into photoreaction tank 2. Then, water treatment apparatus 1 determines whether or not the calculated total amount of ions is greater than the first threshold value.

Note that, as has been described above, it is possible to calculate the total amount of ions having flowed into photoreaction tank 2 using ionic conductivity meter 421. However, the concentration (the total amount) of ions of several kinds cannot be individually obtained. This is because the total amount of ions calculated using ionic conductivity meter 421 is the value that reflects total amount of ions of all kinds. In addition, not every kind of ions contributes to deterioration of the photocatalyst. Therefore, the degree of deterioration of the photocatalyst cannot be specified from the total amount of ions having flowed in. On the other hand, it is known that ions that relate to deterioration of the function of the photocatalytic particles are calcium ions, and the amount of Ca with which the function of the photocatalytic particles reduce is also known. Accordingly, assuming that the maximum value of the flowed-in calcium amount is 50% as great as the total amount of ions calculated in the foregoing, the first threshold value is calculated.

Next, when the total amount of ions calculated in Step S41 is equal to or smaller than the first threshold value (No in S41), control returns to the process in Step S2 and the operation is continued.

On the other hand, when the total amount of ions calculated in Step S41 is greater than the first threshold value (Yes in S41), photocatalytic activity measuring apparatus 44 measures the activity of the photocatalytic particles, and determines whether or not the activity of the photocatalytic particles is equal to or smaller than the second threshold value (S42).

Note that, when the calculated total amount of ions is greater than the first threshold value, it means that Ca ions of the amount with which the function of the photocatalytic particles deteriorates to the lower limit (the value not fulfilling the performance) are presumed to have been introduced. Measuring the activity of the photocatalytic particles with photocatalytic activity measuring apparatus 44 is as described above, and therefore the description thereof is not repeated.

Next, in Step S42, when the activity of the photocatalytic particles is equal to or smaller than the second threshold value (Yes in S42), control transits to the process in Step S5, and the function recovery process is performed (S5).

On the other hand, in Step S42, when the activity of the photocatalytic particles is greater than the second threshold value (No in S42), an updating process of updating the first threshold value to the third threshold value is performed (S43). Thereafter, control returns to the process in Step S2, and the operation is continued.

Here, a description will be given of the reason why the updating process is necessary. What has been used is the first threshold value calculated on the assumption that the concentration of calcium is at the maximum (e.g., 50%) in the total amount of ions contained in the total amount of the contaminated water introduced into photoreaction tank 2. However, since the activity of the photocatalytic particles is greater than the second threshold value, the actual concentration of calcium is smaller than the assumed value (50%). In this manner, when the process of Step S4 is performed upon an occurrence of an alert signal at an initial stage, the activity of the photocatalytic particles may not have reduced to the level that requires the function recovery process.

However, since calcium ions introduced into photoreaction tank 2 have reached a certain concentration, the first threshold value cannot be used as it is when the operation is continuously performed. The first threshold value must be updated to the third threshold value which enables to make a determination that part of the aqueous solution (slurry) in photoreaction tank 2 is to be introduced into measurement tank 441 next time. Since the value that shows the current activity of the photocatalytic particles (e.g., absorbance) can be learned, from the value showing the current activity of the photocatalytic particles, the amount of Ca ions serving as an indicator of the activity of the photocatalytic particles which requires the function recovery process can be calculated. That is, the third threshold value that determines the operating time period until next photocatalyst activity measurement can be calculated taking into consideration of the value of total amount of ions contained in the total amount of the contaminated water having been introduced into photoreaction tank 2 at the current time point, and the greatest possible calcium content that can be assumed from the total amount of ions contained in the total amount of the contaminated water that can be introduced into photoreaction tank 2. Specifically, using the measured intensity of visible light transmitted through measurement tank 441 (the first intensity) and the second intensity of visible light transmitted through measurement tank 441 which is calculated when the activity of the photocatalytic particles is at the maximum, the third threshold value can be calculated by multiplying the rate of the first intensity relative to the second intensity by the first threshold value.

In this manner, water treatment apparatus 1 of the present exemplary embodiment presumes deterioration of the function of the photocatalytic particles by two steps. That is, water treatment apparatus 1 according to the present exemplary embodiment calculates, as the first step, to derive that Ca ions has been introduced by the amount that reduces the function of the photocatalytic particles to the lower limit, thereby presuming that the function of the photocatalytic particles has deteriorated. As the second step, water treatment apparatus 1 measures the activity of the photocatalytic particles actually sampled using photocatalytic activity measuring apparatus 44, thereby presuming that the function of the photocatalytic particles is actually deteriorating.

Then, water treatment apparatus 1 according to the present exemplary embodiment temporarily stops water treatment before the activity of the photocatalytic particles so deteriorates that it cannot fulfill the performance, and water treatment apparatus 1 performs the function recovery process for the photocatalytic particles by recycling or replacing the photocatalytic particles.

Thus, since deterioration of the function of the photocatalytic particles can be suppressed under a certain level, water treatment apparatus 1 can operate in the state where the concentration of the contaminating substance in the treated water is constantly lower than the reference value.

Effect and Others

As has been described above, the water treatment apparatus according to the exemplary embodiment of the present disclosure can realize an operation method which prevents deterioration in quality of the post-treatment water, which is water having undergone water treatment using a photocatalyst.

More specifically, the activity of the photocatalytic particles deteriorates by a particular component contained in the contaminated water. Continuous treatment with the deteriorated activity will disadvantageously produce treated water containing the contaminating substance of a concentration exceeding the reference concentration.

Figure 10:
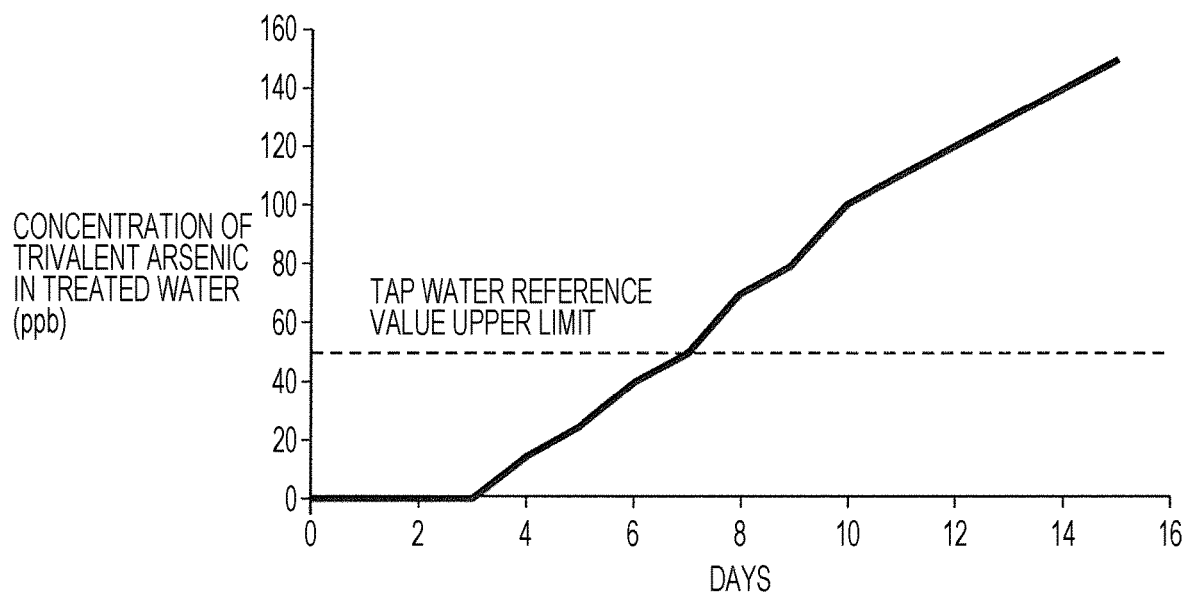
FIG. 10 is a diagram showing an exemplary change in concentration of a contaminating substance in treated water when water treatment is performed with a water treatment apparatus according to Comparative Example.

Here, with reference to FIG. 10, a description will be given of concentration of the contaminating substance when a water treatment apparatus according to Comparative Example is used. FIG. 10 is a diagram showing an exemplary change in concentration of a contaminating substance in treated water when water treatment is performed with the water treatment apparatus according to Comparative Example. FIG. 10 shows an exemplary concentration of trivalent arsenic in treated water when trivalent arsenic in contaminated water is treated with the water treatment apparatus according to Comparative Example, which does not perform the function recovery process and the determining process therefor contrary to water treatment apparatus 1 according to the first exemplary embodiment.

As shown in FIG. 10, with the water treatment apparatus according to Comparative Example, at the time when water treatment is started, the concentration of trivalent arsenic is equal to or smaller than the reference value. However, it can be seen that the concentration of trivalent arsenic gradually rises and exceeds the reference value determined for tap water (tap water reference value upper limit). This is because of a reduction in the treating capacity for trivalent arsenic (capacity of removing contaminated water) of the water treatment apparatus according to Comparative Example, in accordance with a reduction in the activity of the photocatalytic particles. Note that, while data relating to the concentration of trivalent arsenic is shown in FIG. 10, other contaminating substance also shows the same result.

Figure 11:
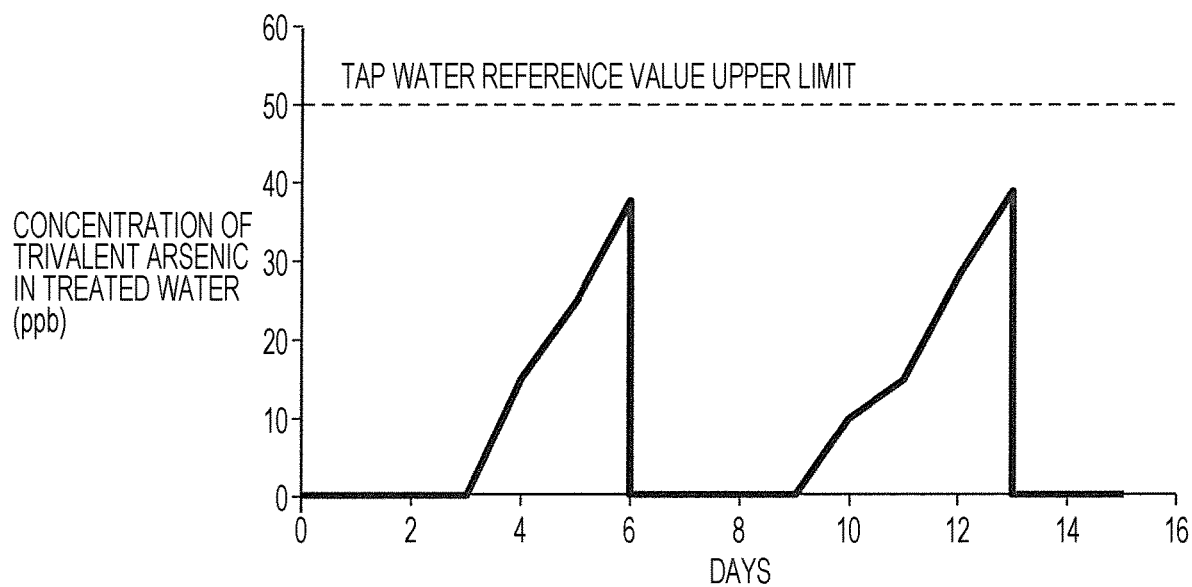
FIG. 11 is a diagram showing an exemplary change in concentration of a contaminating substance in treated water when water treatment is performed with the water treatment apparatus according to the exemplary embodiment.

On the other hand, with reference to FIG. 11, a description will be given of concentration of a contaminating substance when water treatment apparatus 1 according to the present exemplary embodiment is used. FIG. 11 is a diagram showing an exemplary change in concentration of a contaminating substance in treated water when water treatment is performed with water treatment apparatus 1 according to the exemplary embodiment. FIG. 11 shows an exemplary concentration of trivalent arsenic in treated water when trivalent arsenic in contaminated water is treated with the water treatment apparatus according to the present exemplary embodiment.

As shown in FIG. 11, with water treatment apparatus 1 according to the present exemplary embodiment, though the concentration of trivalent arsenic gradually rises in accordance with water treatment time, it can be seen that the function of the photocatalyst is recovered before the tap water reference value upper limit is exceeded, and the concentration of trivalent arsenic is constantly maintained so as not to exceed the tap water reference value upper limit.

Water treatment apparatus 1 according to the present exemplary embodiment presumes deterioration of the function of the photocatalytic particles, and temporarily stops water treatment before the function of the photocatalytic particles so deteriorates that it cannot fulfill the performance and recovers the function of the photocatalytic particles. Accordingly, deterioration of the function of the photocatalytic particles can be suppressed under a certain level. Therefore, water treatment apparatus 1 according to the present exemplary embodiment can operate in the state where the concentration of the contaminating substance in the treated water is constantly lower than the tap water reference value upper limit.

Further, water treatment apparatus 1 according to the present exemplary embodiment presumes deterioration of the function of the photocatalytic particles by two steps, and also performs the updating process of updating the threshold value of the first step (the first threshold value). Thus, without the necessity of using an analysis apparatus employing inductively coupled plasma (ICP) or liquid chromatography, water treatment can be stopped before the function of the photocatalytic particles so deteriorates that it cannot fulfill the performance, and the function of the photocatalytic particles can be recovered.

In the foregoing, while the description has been given of the water treatment method and the water treatment apparatus in one or more modes of the present disclosure based on an exemplary embodiment, the present disclosure is not limited to this exemplary embodiment. One or more modes of the present disclosure may include a mode in which various modifications contemplated by a person skilled in the art are applied to the present exemplary embodiment, and a mode in which constituents of different exemplary embodiments are combined, unless they depart from the spirit of the present disclosure.

For example, in the exemplary embodiment, all or part of the units or the devices, or all or part of the functional blocks of the block diagram of FIG. 6 may be implemented by or one or more electronic circuits including a semiconductor device, a semiconductor integrated circuit (IC) or an LSI (Large Scale Integration). The LSI or the IC may be integrated on one chip, or may be structured by a combination of a plurality of chips. For example, the functional blocks other than a memory element may be integrated on one chip. The LSI and the IC as used herein are called by other names depending on the extent of integration, and may be referred to as a system LSI, a VLSI (Very Large Scale Integration), or an VLSI (Ultra Large Scale Integration). A Field Programmable Gate Array (FPGA) programmed after manufacture of the LSI, or a reconfigurable logic device with which the connections inside the LSI can be reconfigured or circuit partitions inside the LSI can be set up can also be used for the same purpose.

Further, all or part of the functions or operations of the units, the apparatuses, or part of the apparatuses can be executed by software processing. In this case, the software is recorded on one or more non-transitory computer-readable recording media such as ROMs, optical discs, and hard disk drives. When the software is executed by a processing apparatus (processor), the software causes the processing apparatus and peripheral devices to execute particular functions in the software. The systems or the apparatuses may include one or more non-transitory computer-readable recording media recording the software, the processing apparatus (processor), and any required hardware device such as an interface.

The present disclosure can be used in a water treatment method and a water treatment apparatus capable of continuously treating, within a practical period, a harmful substance contained in drinking water, waste water, or rivers or lakes using a photocatalyst suspended in water. The present disclosure can be particularly useful as a household water treating facility or a public water treating facility.

REFERENCE SIGNS LIST

1: water treatment apparatus
2: photoreaction tank
3: separation tank
5: controller
6: pressure gage
7: channel
8: returning passage
9: compressor
10: introducing pump
12: introducing flowmeter
21: light source
22: water level gage
23: contaminated water inlet
24: first outlet
25: first inlet
31: filtering membrane
32: second inlet
33: second outlet
34: treated water outlet
41: flowmeter
42: ionic conductivity measuring apparatus
43, 45: pump
44: photocatalytic activity measuring apparatus
46: photocatalyst recycling apparatus
51: determiner
52, 423: memory
53: transceiver
54: updater
71: circulating pump
72: circulating flowmeter
81: filtering pump
82: filtering flowmeter
421: ionic conductivity meter
422: calculation circuit
424: determination circuit
425: output circuit
441: measurement tank
442 introducing unit
443: light source
443$a$: ultraviolet light source
443$b$: visible light source
443$c$: visible light converter
444: detector
445: output unit

What is claimed is:
1. A water treatment method using a water treatment apparatus that removes impurities, the method comprising:
 (a) providing the water treatment apparatus;
  the water treatment apparatus including
   a first tank that stores slurry containing photocatalytic particles,
   a first light source that irradiates the photocatalytic particles with ultraviolet light within the first tank,
   a flowmeter that measures an amount of an aqueous solution introduced into the first tank,
   an ionic conductivity measuring meter that measures ionic conductivity of the aqueous solution introduced into the first tank,
   a second tank into which part of the slurry in the first tank is introduced,
   an introducing unit that introduces at least one selected from the group consisting of a marker molecule and a stain into the second tank,
   a second light source that irradiates the second tank with visible light,
   a detector that detects intensity of the visible light having transmitted through the second tank; and
   an electronic circuit;
 (b) introducing the aqueous solution containing impurities into the first tank;
 (c) irradiating, from the first light source, the photocatalytic particles with ultraviolet light, to turn the aqueous solution into post-treatment water in which the impurities have been treated;

(d) measuring, with the flowmeter, an amount of the aqueous solution introduced into the first tank;

(e) measuring, with the ionic conductivity measuring meter, ionic conductivity of the aqueous solution introduced into the first tank;

(f) calculating, with the electronic circuit, a total amount of ions contained in a total amount of the aqueous solution introduced into the first tank, using the measured amount of the aqueous solution and the measured ionic conductivity of the aqueous solution;

(g) when the calculated total amount of ions is greater than a first threshold value, introducing part of the slurry in the first tank into the second tank;

(h) introducing, with the introducing unit, at least one selected from the group consisting of the marker molecule and the stain into the second tank;

(i) irradiating, from the second light source, the second tank with visible light;

(j) detecting, with the detector, first intensity of the visible light having transmitted through the second tank; and (k) determining, with the electronic circuit, whether or not the photocatalytic particles have deteriorated based on whether or not activity of the photocatalytic particles calculated based on the first intensity is equal to or smaller than a second threshold value.

2. The water treatment method according to claim 1, wherein:

the water treatment apparatus further includes a third light source that irradiates the second tank with ultraviolet light, in the step (h), the stain is introduced into the second tank, and the water treatment method further comprises following step (h1) between the step (h) and the step (i):

(h1) irradiating the second tank with the ultraviolet light from the third light source.

3. The water treatment method according to claim 1, further comprising:

(1) when the activity of the photocatalytic particles calculated based on the first intensity is greater than the second threshold value, updating, using the first intensity, the first threshold value to a third threshold value with which part of the slurry in the first tank is to be introduced into the second tank in a subsequent slurry introduction operation, wherein:

the steps (d), (e), (f), and (g) are repeated after the step (1), and in the repeated step (g), when the calculated amount of ions is greater than the third threshold value, introducing part of the slurry in the first tank into the second tank.

4. The water treatment method according to claim 3, wherein:

the third threshold value is calculated by multiplying a rate of the first intensity relative to a second intensity of the visible light having transmitted through the second tank by the first threshold value, and the second intensity of the visible light having transmitted through the second tank is acquired when the activity of the photocatalytic particles is at a maximum and when the activity of the photocatalytic particles is greater than the second threshold value.

5. The water treatment method according to claim 1, further comprising:

(l) cleaning the photocatalytic particles with one of an acid solution and an alkali solution, when it is determined that the photocatalytic particles have deteriorated.

6. A water treatment apparatus comprising:

a first tank that stores slurry containing photocatalytic particles, and into which an aqueous solution containing impurities is introduced;

a first light source that irradiates the photocatalytic particles with ultraviolet light within the first tank, to turn the aqueous solution into post-treatment water in which the impurities have been treated;

a flowmeter that measures an amount of the aqueous solution introduced into the first tank;

an ionic conductivity measuring meter that measures ionic conductivity of the aqueous solution introduced into the first tank;

a calculation circuit that is programmed to calculate a total amount of ions contained in a total amount of the aqueous solution introduced into the first tank, using the measured amount of the aqueous solution and the measured ionic conductivity of the aqueous solution;

a first determination circuit that is programmed to determine whether or not the calculated total amount of ions is greater than a first threshold value;

a second tank into which part of the slurry in the first tank is introduced;

a pump that introduces part of the slurry in the first tank into the second tank when it is determined that the total amount of ions calculated by the first determination circuit is greater than the first threshold value;

an introducing unit that introduces at least one selected from the group consisting of a marker molecule and a stain into the second tank;

a second light source that irradiates the second tank with visible light;

a detector that detects first intensity of the visible light having transmitted through the second tank; and a controller that outputs, when activity of the photocatalytic particles calculated based on the first intensity is equal to or smaller than a second threshold value, at least one selected from the group consisting of information prompting replacement of the photocatalytic particles, an instruction of recovering the activity of the photocatalytic particles, and information indicative of deterioration of the photocatalytic particles.

7. The water treatment apparatus according to claim 6, further comprising:

a third light source that irradiates the second tank with ultraviolet light when the stain is introduced into the second tank by the introducing unit, wherein the second light source irradiates the second tank with visible light after the third light source irradiates the second tank with ultraviolet light.

8. The water treatment apparatus according to claim 6, further comprising:

an update circuit that updates, when the activity of the photocatalytic particles calculated based on the first intensity is greater than the second threshold value, using the first intensity, the first threshold value to a third threshold value with which part of the slurry in the first tank is to be introduced into the second tank in a subsequent slurry introduction operation, wherein:

the first determination circuit determines, when the first threshold value is updated to the third threshold value by the update circuit, whether or not the calculated total amount of ions is greater than the third threshold value, and the pump introduces part of the slurry in the first tank into the second tank when the calculated total amount of ions is greater than the third threshold value.

9. The water treatment apparatus according to claim 8, wherein when the activity of the photocatalytic particles is greater than the second threshold value, the update circuit (i) acquires second intensity of the visible light having transmitted through the second tank that is calculated when the activity of the photocatalytic particles is at a maximum, (ii) calculates the third threshold value by multiplying a rate of the first intensity relative to the second intensity by the first threshold value, and (iii) updates the first threshold value to the calculated third threshold value.

10. The water treatment apparatus according to claim 6, further comprising a cleaning unit that cleans the photocatalytic particles with one of an acid solution and an alkali solution, wherein the controller outputs to the cleaning unit, as the instruction of recovering the activity of the photocatalytic particles, an instruction of cleaning the photocatalytic particles with one of the acid solution and the alkali solution.

11. The water treatment method according to claim 1, wherein the electronic circuit is at least one selected from the group consisting of a semiconductor device, a semiconductor integrated circuit, and an LSI.

* * * * *